(12) United States Patent
Bihlmaier

(10) Patent No.: US 11,382,309 B1
(45) Date of Patent: Jul. 12, 2022

(54) ANIMAL CLAW SHEARING APPARATUSES AND METHODS OF USING THE SAME

(71) Applicant: Pet Product Innovations, LLC, Des Plaines, IL (US)

(72) Inventor: Michael J. Bihlmaier, Marengo, IL (US)

( * ) Notice: Subject to any disclaimer, the term of this patent is extended or adjusted under 35 U.S.C. 154(b) by 362 days.

(21) Appl. No.: 16/271,493

(22) Filed: Feb. 8, 2019

Related U.S. Application Data

(63) Continuation of application No. 13/548,986, filed on Jul. 13, 2012, now abandoned.

(51) Int. Cl.
*A01K 13/00* (2006.01)
*A45D 29/02* (2006.01)

(52) U.S. Cl.
CPC .............. *A01K 13/00* (2013.01); *A45D 29/02* (2013.01)

(58) Field of Classification Search
CPC ....... A01K 13/00; A45D 29/02; A45D 29/023
See application file for complete search history.

(56) References Cited

U.S. PATENT DOCUMENTS

| | | |
|---|---|---|
| 1,013,889 A | 1/1912 | Newman |
| 3,838,507 A | 10/1974 | Clark |
| 4,228,585 A | 10/1980 | Nelson |
| D260,308 S | 8/1981 | Suchowski |
| 4,449,297 A | 5/1984 | Fuchs |
| 5,101,563 A * | 4/1992 | d'Orgelys ............. A45D 29/02 30/262 |
| 5,557,849 A * | 9/1996 | Lee ......................... A45D 29/02 132/75.4 |
| 6,557,259 B1 * | 5/2003 | Nguyen ................. A45D 29/02 132/75.5 |
| 7,007,387 B2 | 3/2006 | Kuzuu |
| 8,100,088 B2 | 1/2012 | Manheimer, III et al. |
| 2006/0042559 A1 * | 3/2006 | Kang ...................... A01K 13/00 119/600 |

(Continued)

FOREIGN PATENT DOCUMENTS

| | | |
|---|---|---|
| CN | 2905371 Y | 4/2006 |
| CN | 2792169 A | 7/2006 |
| CN | 200966258 Y | 10/2007 |

(Continued)

OTHER PUBLICATIONS

JP 3096809 machine translation (Year: 2004).*

(Continued)

*Primary Examiner* — Son T Nguyen
(74) *Attorney, Agent, or Firm* — Cahn & Samuels, LLP

(57) ABSTRACT

Apparatuses disclosed herein aid in shearing animal claws. Specifically, the present invention provides a shearing apparatus having at least one curved blade, but preferably two curved blades, allowing cutting of the animal's claw from opposite sides of the animal's claw, and at least one well for placing the animal's claw therein, wherein said two curved blades are disposed at an aperture located at the bottom of the well. The well and aperture combination stops the animal's claw from being sheared too close to nerve endings and the animal's blood supply, preventing or minimizing the incidence of injury and suffering to the animal. Methods of using the apparatus are further disclosed herein.

8 Claims, 4 Drawing Sheets

(56) References Cited

U.S. PATENT DOCUMENTS

2009/0158593 A1\* 6/2009 Smith .................. A01K 13/00
                                                                               30/28

FOREIGN PATENT DOCUMENTS

| | | | |
|---|---|---|---|
| CN | 101461331 A | | 6/2009 |
| DE | 1231860 B | | 1/1967 |
| GB | 12262240 A | | 3/1971 |
| JP | 3096809 X | | 3/2003 |
| KR | 950008395 Y1 | \* | 10/1995 |
| WO | WO-2005084423 A1 | \* | 9/2005 ............. A01K 13/00 |

OTHER PUBLICATIONS

Translation of Chinese Search Report Request No. 2014800762111.
English Abstract of CN2792169.
English Abstract of CN2905371.
English Abstract of CN101461331.
English Abstract of CN200966258.
English Abstract of JP3096809.

\* cited by examiner

ANIMAL CLAW SHEARING APPARATUSES AND METHODS OF USING THE SAME

CROSS REFERENCE TO RELATED APPLICATION

This application is a continuation of application Ser. No. 13/548,986 filed Jul. 13, 2012.

TECHNICAL FIELD

The present invention relates to apparatuses for shearing animal claws. Specifically, the present invention provides shearing apparatuses having at least one curved blade. Preferably, the present invention provides a shearing apparatus having two curved blades, allowing cutting of the animal claw from opposite sides of the animal's claw, and at least one well for placing the animal's claw therein, wherein said two curved blades form apertures within wells. The well and aperture combination stops the animal's claw from being sheared too close to nerve endings and the animal's blood supply, preventing or minimizing the incidence of injury and suffering to the animal. Methods of using the apparatus are further disclosed herein.

BACKGROUND

It is, of course, generally known to cut, trim or otherwise shear animal claws. Generally, animal claws, such as animals that are pets, farm animals, performance animals, or the like, can have relatively sharp claws that are typically used for defense or predatory behavior. In most cases, claws are naturally sharp, or the animals instinctively sharpen the same through their behavior. A cat, for example, instinctively maintains the sharpness of their claws by scratching items, such as trees or the like. This is due to the fact that cats' claws lose an outside layer of their claws periodically, exposing newer and sharper claws therebeneath. Scratching their claws helps to remove this sheath when necessary.

In many cases, it is desirable to reduce the sharpness of animals' claws, especially if the animal is a pet that may live in close proximity to people, or if the animal comes into close proximity to other animals. Specifically, it is known to utilize shearing devices for cutting the animals' claws when desired.

For example, U.S. Pat. No. 4,449,297 relates to an animal claw cutting apparatus having a pair of cutters having cooperating shearing edges. A first cutter has a concave cylindrically shaped surface, the bottom edge of which is generally circular. The second cutter has a U-shaped member with the base portion provided at the center with an upwardly extending post having a flat upper surface.

However, heretofore known devices and apparatuses for cutting animal claws suffer from disadvantages. Specifically, many known claw cutters utilize a blade that pinches the animals' claws to shear the same, creating forces that may deform, bend or even shatter the animal's claws in undesired areas. Thus, a need exists for an apparatus and methods of using the same that quickly and evenly shears the animals' claws without pinching the same, minimizing deformations, bending or even shattering of the claws during cutting.

For example, many known claw cutters utilize a so-called "guillotine"-type cutting device, having a linear blade that cuts straight through the animals' claws, imparting uneven forces on the animals' claws as the blades cuts. A need exists for an apparatus and methods of using the same that includes one or more curved blades that evenly distribute cutting forces on the animals' claws, since the animals' claws are roughly round in cross-section.

Moreover, heretofore known devices and apparatuses for cutting animals' claws require extensive force to cut through the animals' claws, and individuals may not have sufficient strength to fully cut the same, as necessary. Thus, a need exists for an apparatus and methods of using the same that requires minimal cutting force to accomplish the cutting task through the animals' claws.

In addition, many known devices or apparatuses utilize a relatively large aperture or cutting surface for fitting the animals' claws therein for cutting the same, requiring the user of the devices or apparatuses to gauge the best or optimal cutting location on the animals' claws. However, if an animal's claw is cut too close to the base of the claw, then the claw may be cut too close to nerves and blood supply, causing injury and pain or discomfort for the animal, and possibly bleeding. A need, therefore, exists for an apparatus and methods of using the same that prevents cutting the animals' claws too closely to nerves and/or blood supply, preventing injury and pain or discomfort to the animal.

Further, it is difficult to prevent an animal from moving when attempting to cut the animal's claws, unless the animal is completely anesthetized prior to the same. It is rare to anesthetize an animal during a claw-cutting procedure, so animals tend to move, squirm or the like during the process. Thus, it may be difficult to ensure that the animal's claws are not cut too closely to the nerve endings and/or blood supply, as detailed above, especially if the animal moves, or squirms during the cutting process. A need, therefore, exists for an apparatus and methods of using the same for ensuring that animals' claws are not cut too close to nerves or blood supply, especially if the animals move or squirm during the cutting procedure.

Many known devices require a keen eye to ensure that the claws are cut at the proper location so as not to cut too closely to nerves and/or blood supply. In many instances, individuals with poor eyesight or limited dexterity may find it difficult to hold a claw and a cutting tool to cut the claw at the proper location or to even see where the proper cutting location may be. A need, therefore, exists for an apparatus and methods of using the same that allows individuals with poor eyesight and/or limited dexterity to utilize the apparatus to cut animals' claws in the proper cutting location.

SUMMARY OF THE INVENTION

The present invention relates to apparatus for shearing animal claws. Specifically, the present invention provides a shearing apparatus having at least one curved blade. More specifically, the present invention provides a shearing apparatus having two curved blades, allowing cutting of the animal claw from opposite sides of the animal's claw, and at least one well for placing the animal's claw therein, wherein said two curved blades are disposed at an aperture located within the well. The well and aperture combination stops the animal's claw from being sheared too close to nerve endings and the animal's blood supply, preventing or minimizing the incidence of injury and suffering to the animal. Methods of using the apparatus are further disclosed herein.

To this end, in an embodiment of the present invention, an apparatus for cutting animals' claws is provided. The apparatus comprises: a first arm and a second arm, the first arm connected to the second arm and movable relative to the second arm; a first aperture disposed in the first arm, the first aperture bounded by a first cutting blade; a second aperture disposed in the second arm, wherein the first aperture and the second aperture are aligned together when the first arm is in a first position relative to the second arm, and further wherein the first aperture and the second aperture are misaligned when the first is in a second position relative to the second arm.

In an embodiment, the first aperture is disposed in a conical well within the first arm.

In an embodiment, the first aperture is disposed in a first conical well within the first arm and the second aperture in a second well in the second arm.

In an embodiment, the second well is conical in shape, and the second aperture is bounded by a second cutting blade.

In an embodiment, the first cutting blade is disposed adjacent the second cutting blade when the first aperture is aligned with the second aperture.

In an embodiment, the first cutting blade is curved.

In an embodiment, the second cutting blade is curved.

In an embodiment, the apparatus further comprises: a pivot point where the first arm and the second arm are connected together, wherein the first arm pivots with respect to the second arm at the pivot point allowing the first arm to move relative to the second arm from the first position to the second position.

In an embodiment, the pivot point is a pin disposed through the first arm and the second arm.

In an embodiment, the first arm is disposed above the second arm and further wherein the first arm slides relative to the second arm between the first position and the second position.

In an embodiment, the apparatus further comprises: a spring connected to the first arm for moving the first arm to the first position relative to the second arm after being moved into the second position by an external force.

In an embodiment, the second well comprises a restrictor for restricting the movement of an animal's claw through the second well.

In an embodiment, the apparatus further comprises: a stopper on the second arm, wherein the stopper restricts movement of the first arm relative to the second arm.

In an alternate embodiment of the present invention, a method of using an apparatus for shearing an animal's claw is provided. The method comprises the steps of: providing an apparatus for shearing an animal's claw, the apparatus comprising a first arm and a second arm, the first arm connected to the second arm and movable relative to the second arm, a first aperture disposed in the first arm, the first aperture bounded by a first cutting blade, a second aperture disposed in the second arm, wherein the first aperture and the second aperture are aligned together when the first arm is in a first position relative to the second arm, and further wherein the first aperture and the second aperture are misaligned when the first arm is in a second position relative to the second arm; disposing an animal's claw through the first and second apertures; misaligning the first aperture and the second aperture by moving the first arm relative to the second arm; and cutting the animal's claw with the first cutting blade when the first aperture and the second aperture become misaligned.

In an embodiment, the first aperture is disposed in a conical well within the first arm, and further wherein the method comprises the step of: disposing the animal's claw within the conical well and then through the first and second apertures before cutting the claw.

In an embodiment, the first aperture is disposed in a first conical well within the first arm and the second aperture is disposed in a second well within the second arm.

In an embodiment, the second well is conical in shape, and the second aperture is bounded by a second cutting blade, and further wherein the method comprises the step of: disposing the animal's claw within the second well and then through the first and second apertures before cutting the claw.

In an embodiment, the first cutting blade is disposed adjacent the second cutting blade when the first aperture is aligned with the second aperture, and further wherein the method comprises: cutting the animal's claw with both the first cutting blade and the second cutting blade when misaligning the first aperture and the second aperture.

In an embodiment, the method further comprises the step of: pivoting the first arm relative to the second arm when moving the first arm.

In an embodiment, the method further comprises the step of: sliding the first arm on the second arm when moving the first arm.

It is, therefore, an advantage and objective of the present invention to provide an apparatus and methods of using the same that quickly and evenly shears the animals' claws without pinching the same, minimizing deformations, bending or even shattering of the claws during cutting.

Further, it is an advantage and objective of the present invention to provide an apparatus and methods of using the same that includes one or more curved blades that evenly distribute cutting forces on the animals' claws, since the animals' claws are roughly round in cross-section.

Still further, it is an advantage and objective of the present invention to provide an apparatus and methods of using the same that requires minimal cutting force to accomplish the cutting task through the animals' claws.

Moreover, it is an advantage and objective of the present invention to provide an apparatus and methods of using the same that prevents cutting the animals' claws too closely to nerves and/or blood supply, preventing injury and pain or discomfort to the animal.

Relatedly, it is an advantage and objective of the present invention to provide an apparatus and methods of using the same for ensuring that animals' claws are not cut too close to nerves or blood supply, especially if the animals move or squirm during the cutting procedure.

Further, it is an advantage and objective of the present invention to provide an apparatus and methods of using the same that allows individuals with poor eyesight and/or limited dexterity to utilize the apparatus to cut animals' claws in the proper cutting location.

Additional features and advantages of the present invention are described in, and will be apparent from, the detailed description of the presently preferred embodiments and from the drawings.

BRIEF DESCRIPTION OF THE FIGURES

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to apparatus for shearing animal claws. Specifically, the present invention provides a shearing apparatus having at least one curved blade. More specifically, the present invention provides a shearing apparatus having two curved blades, allowing cutting of the animal claw from opposite sides of the animal's claw, and at least one well for placing the animal's claw therein, wherein said two curved blades are disposed at an aperture located within the well. The well and aperture combination stops the animal's claw from being sheared too close to nerve endings and the animal's blood supply, preventing or minimizing the incidence of injury and suffering to the animal. Methods of using the apparatus are further disclosed herein.

Figure 1:
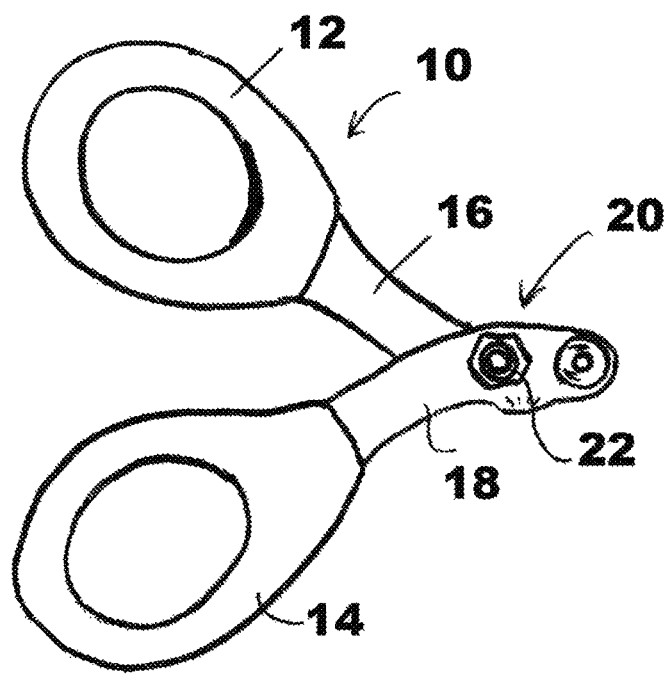
FIG. 1 illustrates a plan view of an animal claw shearing apparatus in an embodiment of the present invention.

Now referring to the drawings, wherein like numerals refer to like parts, FIG. 1 illustrates a claw shearing apparatus 10 in an embodiment of the present invention. The apparatus 10 may include a pair of hand grips 12, 14 forming a handle that may be gripped by a user in the user's hand. Specifically, hand grips 12, 14 may accept fingers or, more precisely, a finger and a thumb of the user's hand when in use, and may further have a rubbery elastomeric coating thereon for comfort, as apparent to one of ordinary skill in the art. Hand grips 12, 14 may include arms 16, 18, respectively, extending from the hand grips 12, 14 and meeting at a pivot point 20 having a pin 22 therein for allowing the hand grips 12, 14 and respective arms 16, 18 to pivot thereon. The pin 22 may be a nut and bolt combination, a rivet, or any other like mechanism for holding the arms 16, 18 together and allowing the same to pivot relative to each other.

Figure 2:
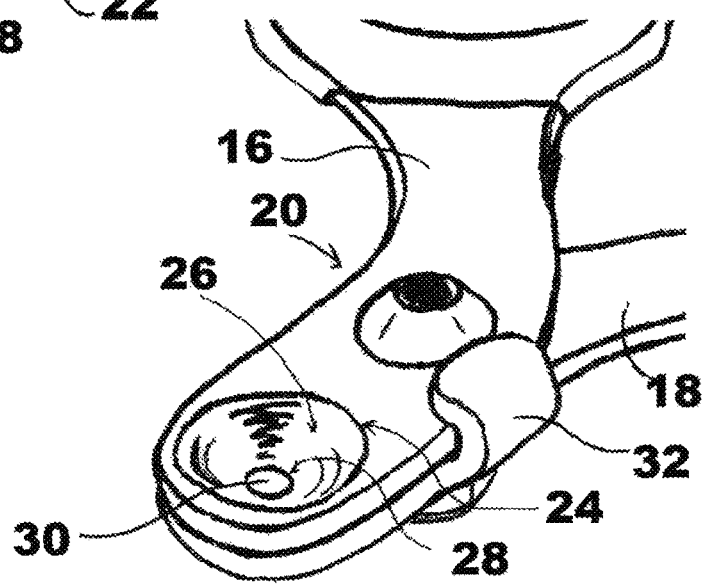
FIG. 2 illustrates a close-up perspective view of the animal claw shearing apparatus in an embodiment of the present invention.

As illustrated in FIG. 2, a close-up perspective view of the apparatus 10, the end of the arm 16 may include a well 24 disposed therein. The well may be circular, or roughly circular in shape, and may have angled sides 26 forming a conical depression within the arm 16. Within the conical well 24 may be a circular cutting blade 28 forming a perimeter of a claw-receiving hole or aperture 30. The circular cutting blade 28 is preferably disposed at the bottom of the well 24, forming the periphery of the aperture for receiving the animal claw, as disclosed in more detail below.

Figure 3:
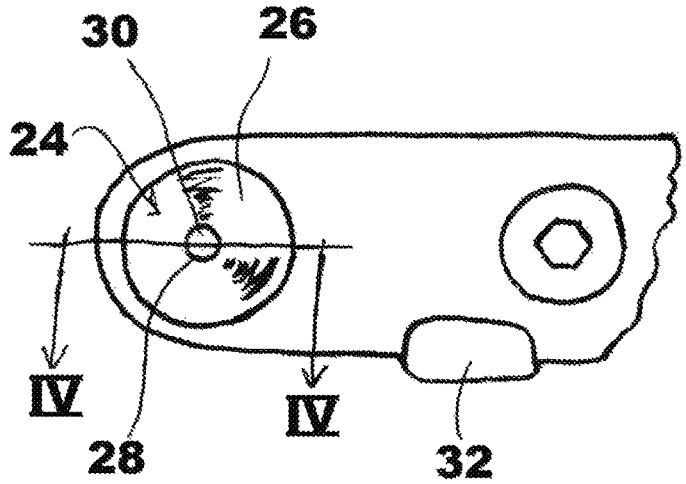
FIG. 3 illustrates a close-up plan view of the animal claw shearing apparatus in an embodiment of the present invention.
Figure 4:
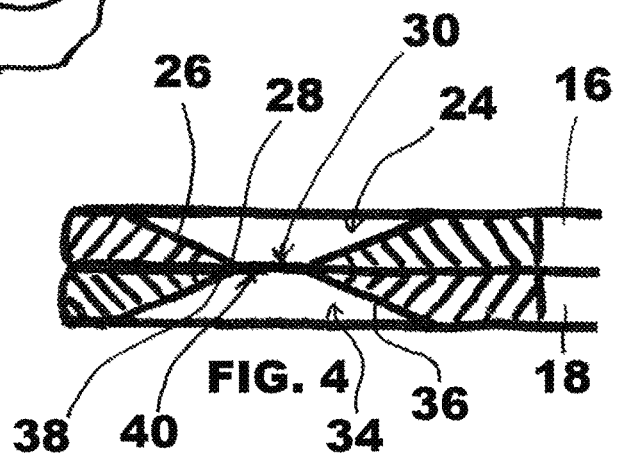
FIG. 4 illustrates a sectional view of the animal claw shearing apparatus viewed along line IV-IV of FIG. 3 in an embodiment of the present invention.

FIG. 3 illustrates a close-up plan view of the apparatus 10, specifically including the conical well 24. As illustrated in FIGS. 2 and 3, the arm 18 may include a flange 32 that may act as a stopper so that the arms 16, 18 may pivot to a certain point with respect to each other. The point at which the arms 16, 18 may be limited may allow holes in both the arms 16, 18 to align allowing an animal's claw to be disposed therein. FIG. 4, a sectional view of the apparatus 10 viewed along line IV-IV of FIG. 3 illustrates a second conical well 34 disposed in arm 18 matching the conical well 24 disposed in arm 16, but inverted. Thus, the second well 34 may form an inverted conical shape relative to the conical well 24. The second well 34 may have sloping walls 36 and a circular cutting blade 38 disposed within the well, forming a perimeter of a claw-receiving hole or aperture 40. When aligned, as shown in FIGS. 1-4, the cutting blades 28 and 38 may be disposed adjacent one another, and the respective claw-receiving holes 30, 40 may align to allow passage of an animal's claw therethrough.

Figure 5:
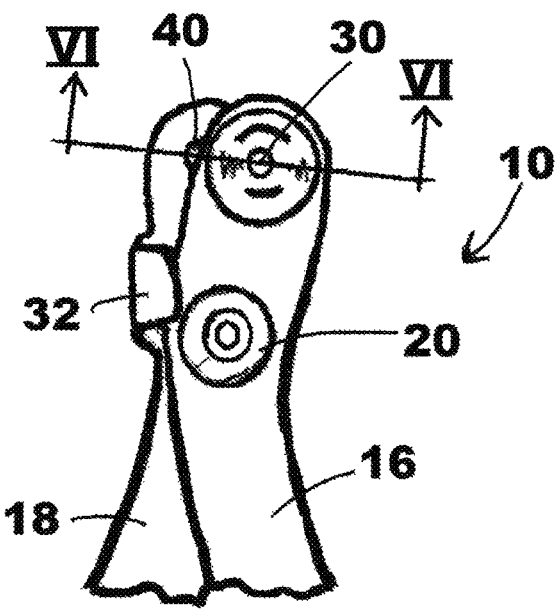
FIG. 5 illustrates a close-up plan view of the animal claw shearing apparatus in a displaced configuration in an embodiment of the present invention.
Figure 6:
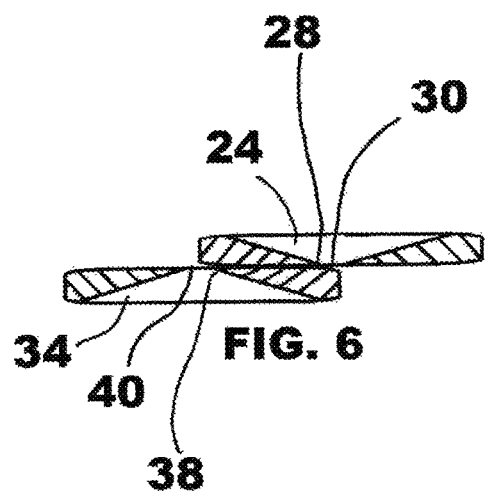
FIG. 6 illustrates a sectional view of the animal claw shearing apparatus viewed along line VI-VI in an embodiment of the present invention.

FIG. 5 illustrates the apparatus 10 having wells 24, 34 unaligned due to pivoting movement of the arms 16, 18 via pivot 20. Preferably, the arms 16, 18 may be moved by squeezing the hand grips 12, 14 together so that they come together and meet, like using scissors. The movement of the arms 16, 18 may displace the wells 24, 34 from each other, thereby misaligning the holes 30, 40 from each other. FIG. 6 illustrates a cross-sectional view viewed along lines VI-VI of FIG. 5 illustrates how the holes 30, 40 become misaligned when arms 16, 18 move relative to each other. An animal claw disposed through the holes 30, 40 may preferably be sheared by both the circular cutting blades 28, 38, respectively, when the arms 16, 18 are moved and the holes 30, 40 become misaligned.

Figure 7:
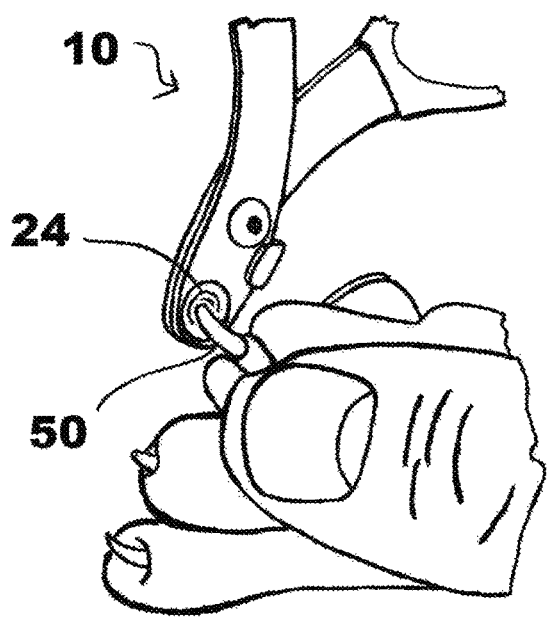
FIG. 7 illustrates a perspective view of the animal claw shearing apparatus in operation in an embodiment of the present invention.
Figure 8:
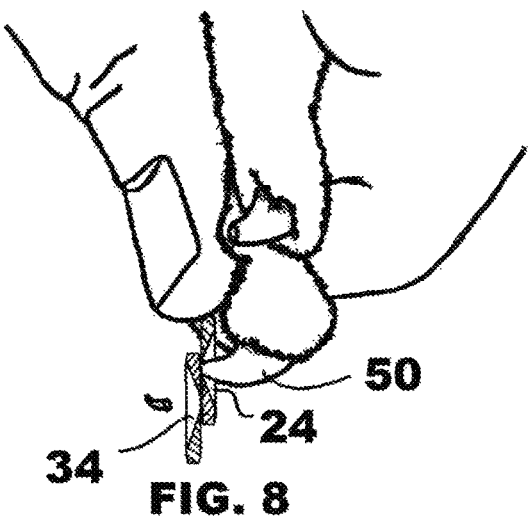
FIG. 8 illustrates a sectional view of the animal claw shearing apparatus in operation shearing an animal claw in an embodiment of the present invention.

Specifically, as illustrated in FIG. 7, an animal claw 50 may be placed within well 24 of the apparatus 10 through holes 30, 40 (not shown) when the holes 30, 40 are aligned. The conical shape and sloping walls 26 of the well 24 may aid a user in placing the animal's claws through the holes 30, 40. Squeezing hand grips 12, 14 together misaligns holes 30, 40 and engages cutting blades 28, 38 to the animal claw, thereby cutting the claw from both sides of the claw, as illustrated in FIG. 8. Shearing of the claw is easy and efficient because the shapes of the circular cutting blades 28, 38 generally match the animal's claw, in cross-section, allowing more blade surface to engage the claw when shearing the same. Moreover, by cutting from both sides via blades 28, 38, the animal claw may be cut more expeditiously and cleanly. Finally, the holes 30, 40 may be appropriately sized to only receive the animal's claws up to a certain length therethrough, providing an easy way for a user to determine the proper cutting location on the animal's claw. This may minimize cutting an animal's claw too short, thereby minimizing discomfort, pain, and/or bleeding of the same.

Figure 11A:
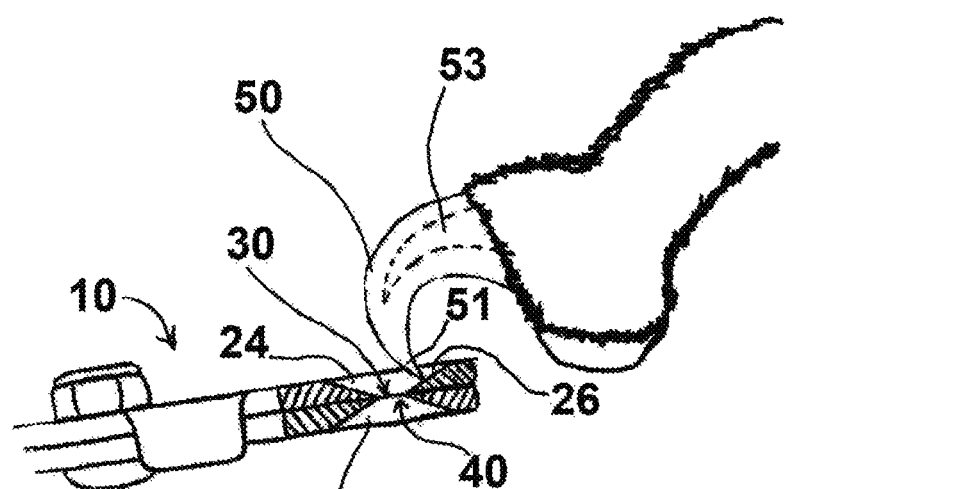
FIGS. 11A-11C illustrates side and sectional views of an apparatus shearing an animal's claw in an embodiment of the present invention.
Figure 11B:
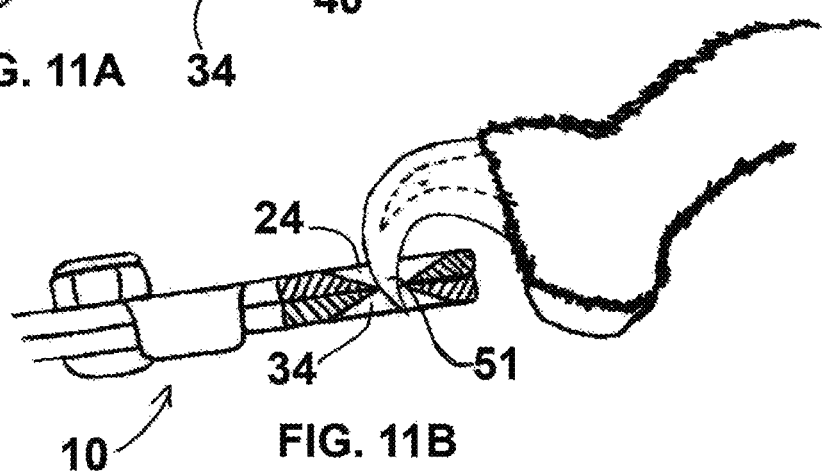
Figure 11C:
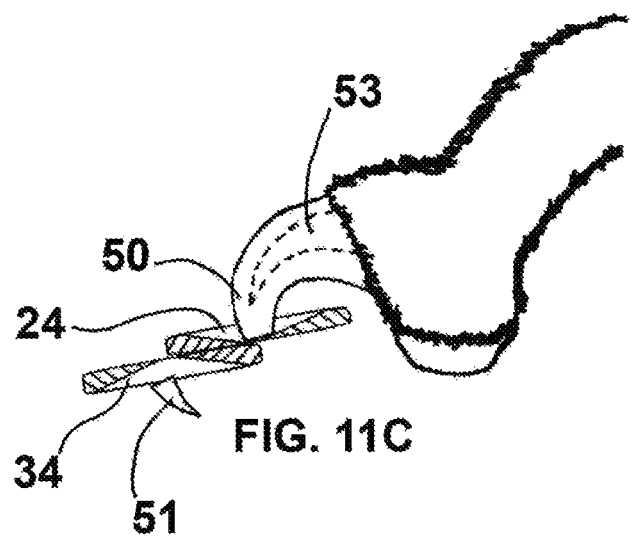

Specifically, FIGS. 11A-11C illustrates a method of using the apparatus 10 in an embodiment of the present invention. An animal's claw 50, such as a cat's claw, for example, having a tip 51 and a core 53 having nerves and/or blood vessels, may be placed within the well 24 of the apparatus 10, as illustrated in FIG. 11A. The relatively wider opening at the top of the sloping walls 26 may allow a user to more easily place the tip 51 of the claw 50 through the holes 30, 40 for shearing of the same. The claw 50 may interact with the relatively large opening of the well 24 and traverse the well wall 26 to the holes 30, 40, which are aligned to allow passage of the tip 51 of the claw 50, as illustrated in FIG. 11B. Preferably, the holes 30, 40 may be sized to allow only the tip 51 of the claw 50 through the holes 30, 40 so that the shearing of the tip 51 from the claw 50 does not hit the core 53 and any nerves or blood vessels contained therein, as illustrated in FIG. 11C.

Specifically, FIG. 11C illustrates the movement of the well 24 relative to the well 34, illustrated in cross-sections, allowing the blades, as described herein, to shear the tip 51 from the remainder of the claw 50. Thus, the well 24 may guide the tip 51 of the claw 50 through the holes, making it easier for a user to shear the animal's claw, especially if the animal is being uncooperative, or if the user has manual dexterity issues.

Figure 9:
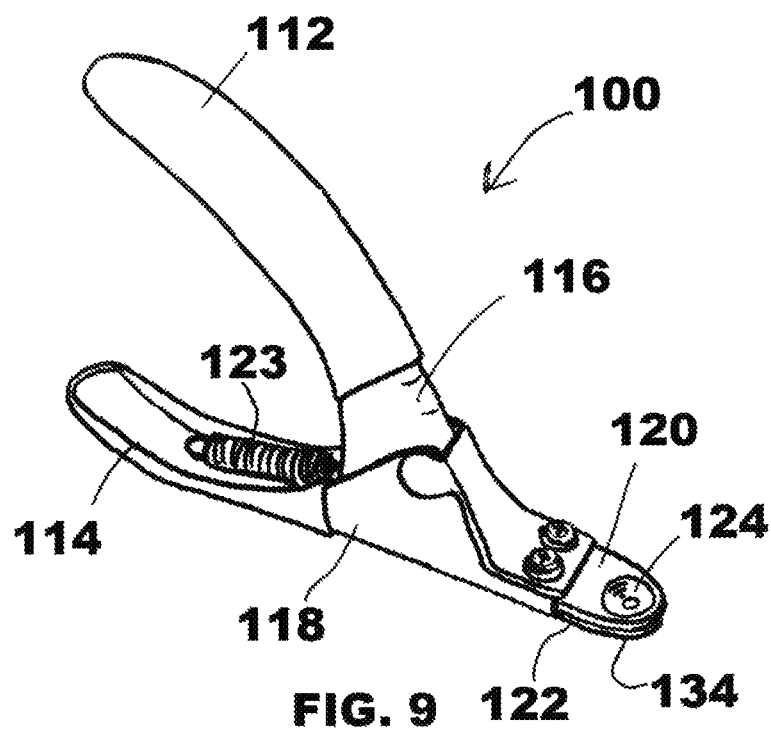
FIG. 9 illustrates an animal claw shearing apparatus in an alternate embodiment of the present invention.

In an alternate embodiment of the present invention, an apparatus 100 is illustrated in FIG. 9. The apparatus 100 may be similar to the apparatus 10, illustrated and described above with reference to FIGS. 1-8, although arms 116, 118 may extend to form handles 112, 114 that may be squeezed together as one would hold and utilize a pair of pliers instead of a pair of scissors.

Attached to ends of the arms 116, 118 may be plates 120, 122 having wells 124, 134 disposed therein having cutting blades and holes, the wells being formed similarly to the wells 24, 34, described above. Squeezing together handles 112, 114 may move plate 120 relative to plate 122 to misalign the wells 124, 134 allowing the cutting blades to shear the animal's claw, as described above. A spring 123 may allow the apparatus 100 to move back to its starting position, namely moving the handles back to the starting position, realigning wells 124, 134 to allow an animal claw to be placed therethrough.

Figure 10:
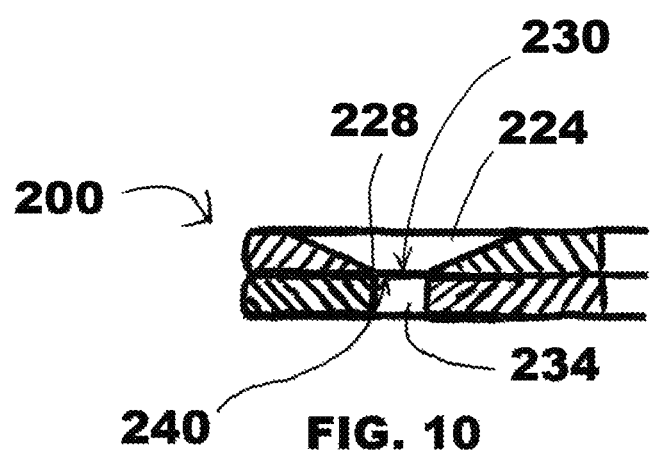
FIG. 10 illustrates a sectional view of a claw shearing apparatus cutting blade in an alternate embodiment of the present invention.

Although a preferred embodiment includes a pair of wells, whether wells 24, 34 or wells 124, 134, as described above, the present invention contemplates alternate arrangements, including only a single conical well 224 having a circular cutting blade 228 and a hole 230, and a second perpendicular well 234 with a hole 240, as illustrated in the cross-sectional view of the apparatus 200 shown in FIG. 10. The second well 234 may not have a cutting blade. Thus, when the respective wells are misaligned through movement of the arms of the apparatus, only the cutting blade 228 may shear the animal claw when placed therein.

Alternatively, well 234 may have a plate or cover (not shown) disposed on an end thereof that acts as a block for an animal claw, thereby blocking the animal claw from being disposed too far through the hole 230, thereby preventing the shearing of the animal claw too far up the claw, preventing or minimizing discomfort, pain, and bleeding of the animal claw.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A method for shearing an animal claw using an apparatus for shearing an animal claw including a first arm and a second arm, the first arm connected to the second arm and movable relative to the second arm; a first conical well disposed proximate to an end of the first arm, the first conical well including a first aperture disposed at an apex and sloping walls to guide the animal claw into the first aperture, and a cutting blade disposed along a periphery of the first aperture; a second well disposed proximate to an end of the second arm, the second well including a second aperture and a cutting blade disposed along a periphery of the second aperture; a first handgrip extending from said first arm and a second handgrip extending from said second arm, the method comprising the steps of:

contacting an animal claw with the surface of the sloping wall of the first conical well, the animal claw including a tip and a core; traversing the sloping wall of the first conical well with the animal claw such that only the tip of the animal's claw passes through the first and second aperture;

misaligning the first aperture and the second aperture by squeezing together the first and second handgrips and moving the first arm relative to the second arm; and cutting the animal claw with the first cutting blade and second cutting blade when the first aperture and the second aperture become misaligned.

2. The method of claim 1, wherein the first handgrip and second handgrip are handles sized to accept a user's finger or a thumb, and further comprising the step of:

manipulating the movement of the first arm relative to the second arm by squeezing the handles together.

3. The method of claim 1 wherein the first and second apertures are wherein said first and second apertures are sized to allow only a tip of an animal's claw to pass therethrough.

4. A method for cutting an animal claw, comprising the steps of:

gripping a first handgrip extending from a first arm and a second handgrip extending from a second arm pivotally connected to said first arm;

guiding an animal claw having a tip and a core into a first conical well disposed proximate to an end of the first arm and traversing a sloping wall of the first conical well with the animal claw;

passing the tip but not the core of the animal claw through a first aperture disposed on an apex of the first conical well;

passing the tip but not the core of the animal claw through a second aperture aligned with the first aperture and disposed proximate to an end of the second arm;

pivoting the first arm relative to the second arm to misalign the first aperture and the second aperture; and cutting the animal claw with a first circular cutting blade disposed along a periphery of the first aperture and a second circular cutting blade disposed along a periphery of the second aperture when the first aperture and second aperture become misaligned.

5. The method of claim 4, wherein the handgrips are handles grippable by a user's thumb and fingers.

6. The method of claim 4, further comprising limiting the pivoting movement of the first arm relative to the second arm beyond a point at which the first aperture and second aperture are aligned.

7. The method of claim 4, wherein the pivotally connected first arm and second arm are movable relative one another about a single pivot point.

8. The method of claim 4 wherein the first and second apertures are wherein said first and second apertures are sized to allow only a tip of an animal's claw to pass therethrough.

* * * * *